A. F. MASURY.
COOLING SYSTEM FOR MOTOR VEHICLES.
APPLICATION FILED JULY 10, 1920.

1,400,562. Patented Dec. 20, 1921.

WITNESS
Geo Schmidt

INVENTOR
Alfred F. Masury
BY
Redding & Greeley
ATTORNEYS

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

COOLING SYSTEM FOR MOTOR-VEHICLES.

1,400,562.  Specification of Letters Patent.  Patented Dec. 20, 1921.

Application filed July 10, 1920. Serial No. 395,360.

*To all whom it may concern:*

Be it known that I, ALFRED F. MASURY, a citizen of the United States, residing in the borough of Manhattan of the city of New York, in the State of New York, have invented certain new and useful Improvements in Cooling Systems for Motor-Vehicles, of which the following is a specification, reference being had to the accompanying drawing, forming a part hereof.

This invention relates to a practical feature of construction of motor vehicles by which it is sought to improve the efficiency of their engines by providing for a direct air cooling of the lower part of such engines and particularly of the crank cases thereof and the oil therein to maintain all of the parts at such a temperature as will insure the greatest efficiency of operation. The improved cooling apparatus for the purpose described is preferably so associated with the fan for the motor as to cause the latter to induce a current of air across the crank case, the fan being located at the rear end of the motor, although such a flow of air is substantially maintained by the forward movement of the vehicle itself. In accordance with the invention the fan of the crank case is so constructed as to receive a maximum volume of air at the forward end and is so mounted and related to the crank case as to direct the air thereover during the forward movement of the vehicle. Where a fan is mounted at the rear end of the motor as is good practice now-a-days in truck construction the current of air expelled by this fan acts upon the air flowing along the pan as to induce a strong flow thereof and to draw it rearwardly at relatively high velocity along the crank case.

One practical embodiment of the invention now in use is illustrated in the accompanying drawing, in which—

Figure 1:
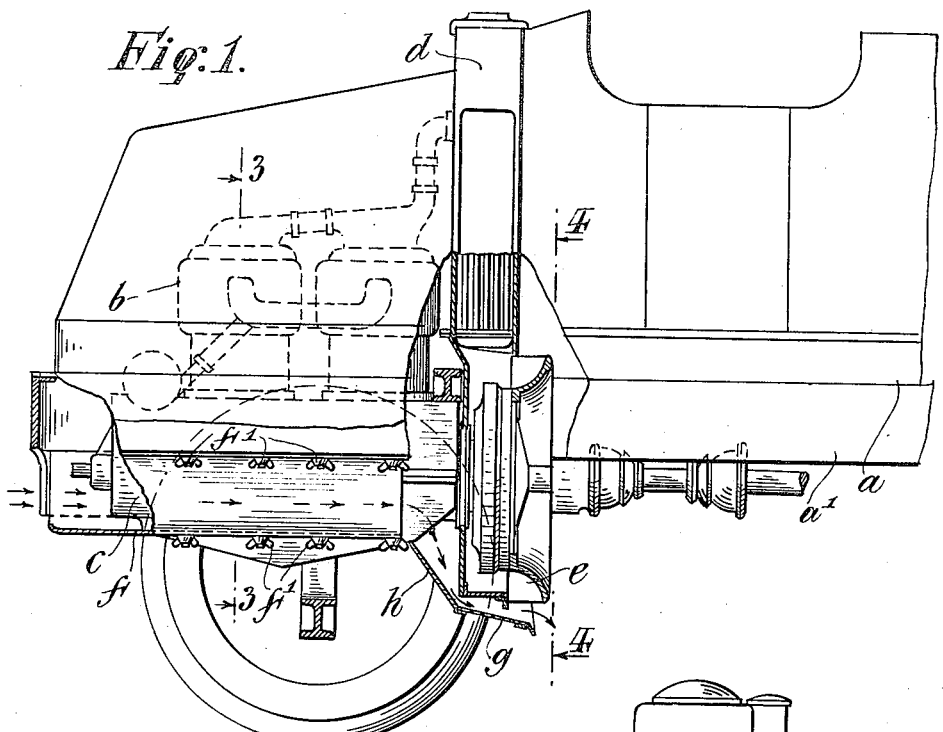
Figure 1 is a view in side elevation of so much of a truck as is necessary for an understanding of the application of the improvements thereto, parts being broken away to show the relation between the crank case and the cooling fan.
Figure 3:
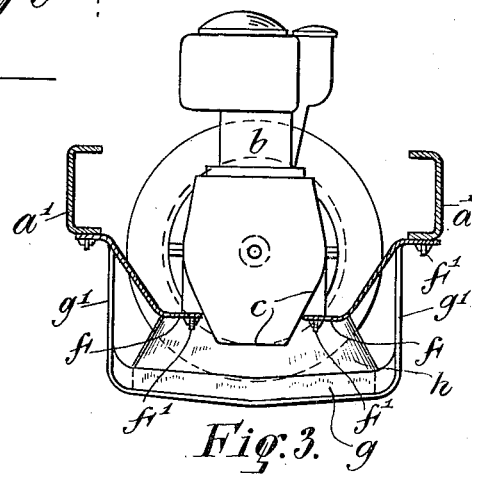
Figure 4:
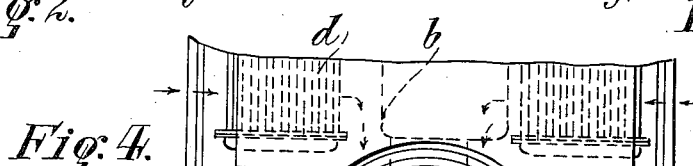

Figs. 3 and 4 are transverse sectional views taken along the planes indicated by the lines 3—3 and 4—4, respectively, of Fig. 1 and looking in the direction of the arrows.

The truck $a$ to which the improvements are illustrated as applied has mounted at its front end a motor $b$ provided with a crank case $c$, the cooling system for the motor being illustrated as a radiator $d$ mounted at the rear side thereof and a suction fan $e$ for the purpose of inducing a strong current of air across the tubes of the radiator $d$ and downwardly therefrom to discharge the air beneath the truck. The invention is not to be limited to this particular type of cooling system for the motor, but it is true, in practice, that a highly efficient and desirable action has been obtained when the present improvements are found in association with the cooling system of the type described since a stronger induced draft of air is secured as will appear more particularly hereinafter.

Figure 2:
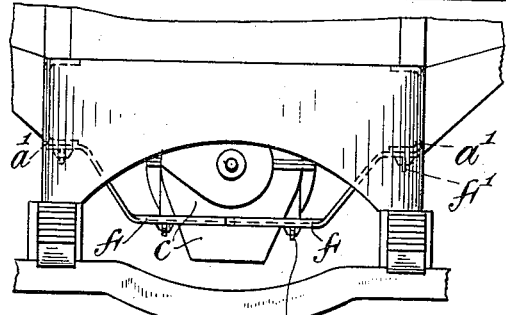
Fig. 2 is a view in front elevation of a portion of the truck shown in Fig. 1.

In accordance with the best practice the crank case $c$ is protected from dirt, etc., by means of a pan $f$ which extends from the crank case to the side frame members $a'$ of the truck $a$. This pan may be of any suitable form, but in the one illustrated it is split longitudinally, the side members thereof having their proximate edges bolted to the crank case as by means of bolts $f'$. In order to afford the greatest protection to the crank case, it has been usual to extend the pan $f$ upwardly at its forward end to prevent more completely the entry of dirt, etc. The present invention consists in providing an open ended pan as illustrated most clearly in Figs. 1 and 2, especially adapted to receive a great volume of air as the truck travels forwardly, this air moving naturally over the crank case $c$ between it and the pan as indicated clearly by the arrows in Fig. 1. This flow of air cools the lower crank case and particularly the oil therein and has been found to maintain this portion of the motor at a temperature which gives greater efficiency of operation than where the crank case is practically surrounded by the pan. In order to pass a greater volume of air over the crank case the channel therefor between the pan and the crank case is brought into such relation to the fan $e$ as to cause the latter to induce a strong draft along the channel and materially to increase the flow of air therethrough. To this end, the pan $g$ which partially surrounds the fan $e$ and may be supported by brackets $g'$ secured to the side frame members *a'* of the truck *a*, is preferably connected with the pan *f* by means of a scoop *h* extending from the rear edge of the pan *f* to the forward end of the pan *g*. The result is that a substantially continuous air passage is formed through the pan *f* to the point of discharge of air from the fan *e* and the air discharged by the fan *e* acts on the air within the pans *f* and *g* so as to impress thereon an induction force sufficient to draw the air rapidly and in great volume through the pan *f* so as to increase materially the cooling action thereof on the lower crank case *c*.

As pointed out hereinbefore the invention is not to be limited in all embodiments to the association with the peculiarly formed pan *f* with a cooling fan of the type shown at *e*, but this combination of elements being functionally related comprises a very practical and important advance in the art.

I claim as my invention:

1. In a motor vehicle in combination with the side frame member of the chassis, a bottom pan open at the front end below the side frame member and in line with the lower crank case and open at the rear end in line with the lower crank case to give free flow of air in a straight line over the lower crank case.

2. In a motor vehicle in combination with a motor and lower crank case thereof, an open ended bottom pan surrounding the latter, a cooling fan mounted rearwardly of the motor, a pan partially surrounding the cooling fan to deflect the air received therefrom and a scoop connecting the bottom pan with the last named pan to direct the air from within the bottom pan to the second named pan and submit it to an inductive action from the air of the fan.

3. In a motor vehicle in combination with a motor and lower crank case thereof, a bottom pan secured to the crank case and to the side frame members of the vehicle and provided with an open end to receive air freely, a cooling fan mounted rearwardly of the crank case and adapted to throw air downwardly, a pan partially surrounding the fan to deflect such last named air, and a scoop connecting the two pans to cause the air from the fan to exert an inductive action on the air within the pans.

This specification signed this 8th day of July, A. D. 1920.

ALFRED F. MASURY.